Aug. 29, 1950 S. C. LYONS ET AL 2,520,320
PROCESS AND APPARATUS FOR WINNING
KAOLIN AND THE LIKE
Filed Sept. 27, 1945 2 Sheets-Sheet 2

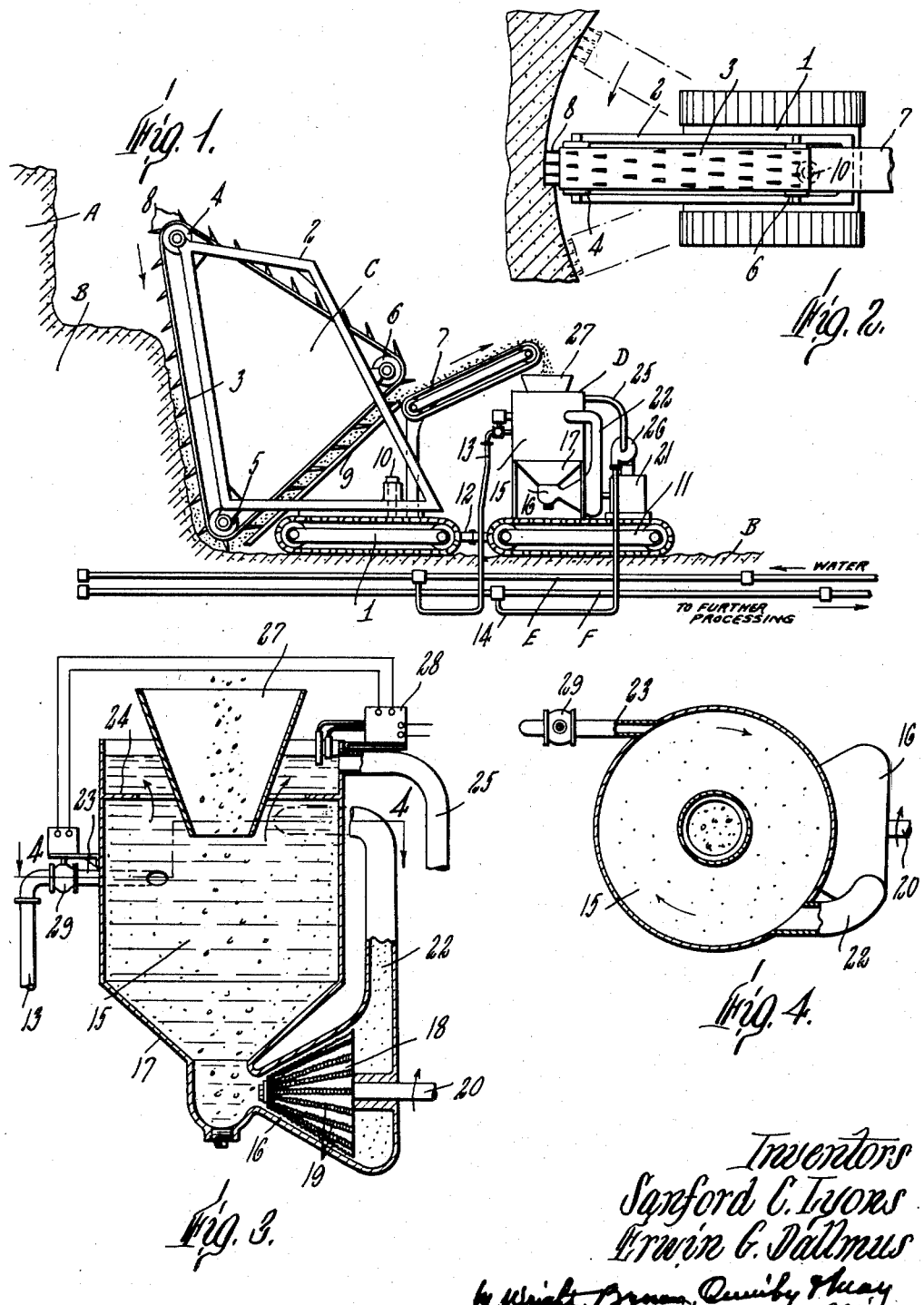

Inventors
Sanford C. Lyons
Francis G. Dallmus
by Wright, Brown, Quinby & Hagy
Attys.

Patented Aug. 29, 1950

2,520,320

UNITED STATES PATENT OFFICE 2,520,320

PROCESS AND APPARATUS FOR WINNING KAOLIN AND THE LIKE

Sanford C. Lyons, Bennington, Vt., and Erwin G. Dallmus, Drybranch, Ga., assignors to Georgia Kaolin Company, Elizabeth, N. J., a corporation of Georgia Application September 27, 1945, Serial No. 618,882

8 Claims. (Cl. 241—20)

The present invention relates to the art of winning kaolin and other clays which are refined mainly while in aqueous suspension for industrial uses. The word "winning" as used in this connection comprehends the steps of taking the clay from the deposits in which it occurs in nature and converting it to a slurry, and may include in addition the transportation of the clay or slurry to a mill where refining and classifying procedures are carried out. Kaolin is the species of clay with which the invention is particularly concerned, wherefore in the following description the material handled and treated will be generally referred to as kaolin; but specific mention of this particular type of clay is not to be construed as a limitation of the invention or as excluding its utility for the winning of any species or type of clay to which the described procedure is applicable.

The invention has for its object to effect improvements and economizes in the winning of kaolin, etc. by eliminating much of the apparatus and labor heretofore employed and practically wholly eliminating delays due to weather conditions. This object is accomplished by blunging the clay at the mine or pit where the crude material occurs and delivering the resulting slurry through a pipe line to the point where further treatment is carried out; and providing for this purpose new combinations of apparatus including a novel form of blunger. The invention consists in the procedure and apparatus above briefly outlined and further described in the following specification, and in all novel characteristics, details and equivalents thereof.

It will be of assistance to an understanding of the utility of this invention to review briefly the procedures now employed in the commercial winning of kaolin with mention of some of the drawbacks attending those procedures.

The refinement and classification of kaolin into fractions and grades suitable for use in the manufacture of paper, rubber, paint, ceramics, etc. require extensive plant facilities. Even though these facilities be built initially close to the deposits of crude kaolin, it becomes necessary, as the parts of the deposits nearest at hand are consumed, to take the crude material from locations more distant from the plant, and frequently at considerable distances away. This requires the use of intermediate transportation means, since the plant itself could not be feasibly moved to keep up with the progress of digging or mining the crude clay.

The conventional methods of transportation heretofore used include railways, trucks, aerial tramways, etc. Not only is it expensive to transport material of this type, because of the fact that the source of the material is constantly becoming more distant as the mining operation progresses—thereby preventing the installation of efficient permanent low cost methods for loading—but even more serious is the weather hazard and the economic losses due to interruption by wet weather. It is not economically or physically feasible to pave the roads into and on the deposit, and the kaolin itself and the clay-like minerals associated with it become extremely slippery and soft when wet by water. Hence mining is necessarily interrupted during, and for several days after, rainfalls.

Because it is not permissible either to interrupt shipments to customers due to weather interruptions, or practically possible to lay off workmen at the mill whenever such an interruption occurs, it is necessary to install at the mill very large storehouses for crude kaolin to provide a reserve for operation while receipts of kaolin from the mine or pit are interrupted. Due to the great tonnages of material involved, these storehouses are necessarily of very large size and are expensive to construct and maintain. Their use also necessitates an additional handling of the clay.

Our invention eliminates the need of all trucks, tramways and the like for transporting crude kaolin to the mill, makes unnecessary the provision of storehouses, and obviates substantially all delays due to rainy weather. The principles of the invention and essential characteristics of one form of means in which the apparatus phase of the invention may be embodied are shown in the accompanying drawings, to which attention is now directed.

In these drawings,

Fig. 1 shows in side elevation and partly diagrammatically a combined digging and blunging apparatus in operative relation to a deposit of kaolin;

Fig. 2 is a plan view of the digging unit of the combined apparatus;

Fig. 3 is a vertical sectional view of the blunging unit of the combined apparatus shown in Fig. 1;

Fig. 4 is a cross section of the blunging unit or blunger shown in Fig. 3;

Like reference characters designate the same parts wherever they occur in all the figures.

Figure 5:
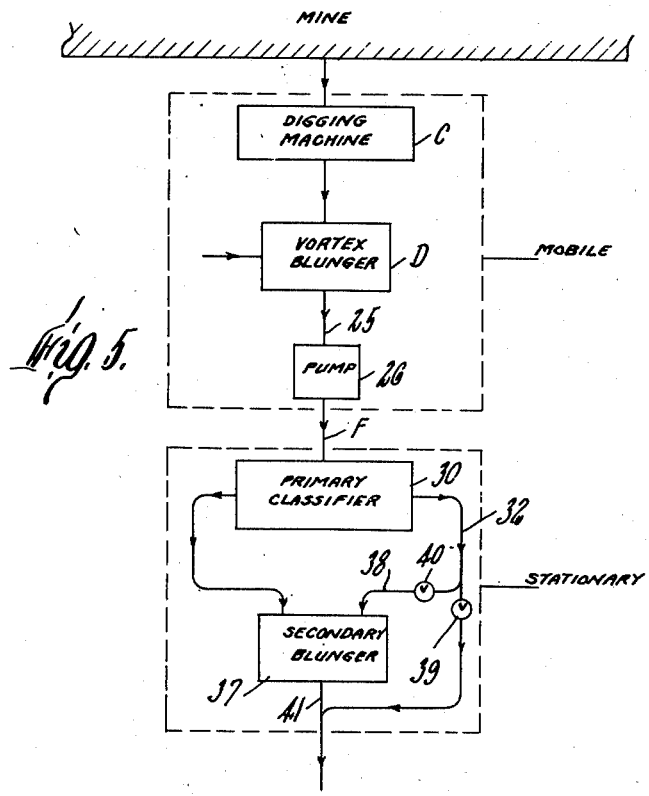
Fig. 5 is a diagram showing the combination of the apparatus above illustrated with associated apparatus for further treating the material which issues from the blunging unit.

In Fig. 1 a typical bed or deposit of kaolin is shown in section. Here A represents the overburden consisting of earth and soil which usually is found above clay deposits and is cleared away to give access to the clay. B represents the kaolin deposit. In mining deposits of this character it is customary to remove the material in layers, each layer being of a depth convenient for the operation of the digging machines used, and these machines being so operated that a more or less nearly level floor is left as the digging proceeds.

The apparatus embodied in our invention includes the combination of a digging unit shown as a whole at C, which may be any one of a number of known diggers, a blunging unit D associated with the digging unit to receive the chips and lumps of clay removed from the pit face thereby, and pipe lines E and F for conducting water to the blunging unit and carrying away slurry therefrom. The digging apparatus here illustrated is a shale planer, which comprises a tractor 1, a frame 2, an endless belt 3 passing around pulleys 4, 5 and 6 (one of which may be a driving pulley or sprocket), on the frame 2, and a delivery conveyer 7. The belt 3 carries cutting bits or teeth 8 and is driven in a path and direction such that one stretch travels downwardly across the exposed, nearly vertical, face of a portion of the clay deposit, and another stretch travels upwardly and rearwardly along a trough 9 which leads to the forward end of the conveyer 7 and through which the broken pieces of clay are carried to the conveyer. The frame 2 is connected to the base or chassis of the tractor by a pivot 10, the axis of which is substantially vertical and passes through, or near to, the contiguous ends of the trough 9 and conveyer 7. The pivot permits swinging of the frame and digging elements horizontally, as shown by broken lines in Fig. 2, so that the cutting bits may sweep across the face of the deposit and cut a wide channel therein. Power means for propelling the tractor 1, driving the belt 3 and conveyer 7, and swinging the frame 2 are not here shown. It is sufficient for the purposes of this description to say that the commercial machines of the type here represented are equipped with such means.

The blunger D is mounted on a trailer 11 connected to the tractor by a coupling 12. The trailer may be provided with tractor type treads, or be of any other character suitable to provide a stable mobile base for the blunger. It may be a self propelled tractor or an idle appendage to the tractor 1. It supports the blunger with the receiving hopper of the latter under the delivery end of the conveyer 7.

The characteristics of the support for the blunger, and whether the blunger is mounted on the same base with the operative parts of the digging unit, are immaterial so far as the generic aspects of the invention are concerned. In this respect it is material only that a blunger and a digging apparatus are associated in a relation such that the digger can cut away pieces from the clay bank and deliver such pieces directly into the blunger; and that both units of this combination can be shifted to follow up the receding face from which clay is being removed and to operate at desired points in the pit.

The water pipes E and F are laid on the floor of the pit. They are made from sections coupled together and to which additional sections are added as needed to extend the pipe lines to shifting locations of the blunger. Flexible pipes or hoses 13 and 14 are coupled with the pipe lines and with the inlet and outlet connections of the blunger. The connections of the hoses with the pipe lines may be made at any of the points where the pipe sections are connected together, or with the extremity of the ultimate section, couplings and end closures being used which have provisions for hose connections. The supply pipe line E can be connected with any water supply convenient for the purpose and the delivery pipe line can run to a mill or to any other point where the slurry from the blunger is to undergo further treatment.

The blunger D is the vital factor of the invention and it embodies important novel characteristics by means of which the clay, in the condition in which it is removed from the deposit, in fragments of heterogeneous sizes, dry or containing only so much moisture as normally exists in the body of clay, may be quickly and efficiently mixed with water to form a slurry in which the solid particles are of such small sizes as to remain in suspension indefinitely. In the embodiment shown in Figs. 3 and 4 of the drawing, the blunger comprises a sedimentation chamber 15, preferably of substantially cylindrical form mounted with its axis vertical or substantially so, and a disintegrating chamber 16 in communication with the bottom of the sedimentation chamber to receive water and lumps of clay which are too large to remain suspended in the water. Preferably the blunger shell is formed with a tapering zone 17 at the bottom of the chamber 15 leading to the inlet of the disintegrating chamber.

In the latter chamber is a disintegrating rotor 18 comprised of a hub having outwardly projecting blades 19 mounted on a shaft 20 which is driven by a motor 21. The disintegrating chamber is preferably of enlarging diameter from its communication with the outlet of the sedimentation chamber, and its end of largest diameter is connected by a conduit 22 with the sedimentation chamber at a level between the top and bottom thereof. The rotor blades likewise are of varying radius corresponding generally to the taper of the disintegrating chamber, whereby their rotation induces flow of water and suspended material from the sedimentation chamber and upward through the conduit 22; and their outer edges are preferably serrated or otherwise roughened, and disposed with a small enough clearance from the chamber walls to break up into smaller particles the lumps of clay which come into contact with them.

The conduit 22 enters the sedimentation chamber tangentially; and the water intake pipe 23, which is connected with the supply hose 13, is tangential also. Both conduits are tangential in the same sense; that is, they are disposed so that the streams issuing from both tend to rotate the body of water in the blunger in the same direction.

An annular baffle 24 is mounted in the upper part of the sedimentation chamber in connection with the walls thereof at a level above the entrance point of conduit 22. An overflow or discharge pipe 25 leads from the blunger at a level above the baffle to the intake of a pump 26 which discharges into the hose 14 and thence to the eduction pipe line F. A hopper 27 is mounted on the upper part of the blunger to receive material from the conveyer 7 and it extends downward through the space surrounded by the annular baffle 24 and its discharge end is preferably below the entrance point of the duct 22 and above that of the supply pipe 23. That part of the hopper which crosses the plane of the baffle is enough smaller than the inner circumference of the baffle to leave room for upward flow of slurry, as indicated in Fig. 3.

Preferably the blunger is equipped with a density controller 28, such as the Myers-Massco pulp density controller, located to be influenced by the specific gravity of the slurry passing to the discharge pipe, and connected to operate by electrical means a valve 29 in the water inlet pipe so as to admit water more or less copiously as needed to maintain the effluent slurry at nearly constant density.

In operation the primary digging apparatus feeds a stream of crude clay, consisting of lumps, chips and more or less fine particles, into the hopper 27 while water is being admitted through the inlet pipe 23 and circulated through the sedimentation chamber and disintegrating chamber by the rotor or disintegrator 18. The tangential arrangement of the ports through which water enters the sedimentation chamber causes the mass of water therein to revolve rapidly.

Extremely fine particles of clay are immediately distributed in suspension in the water, while the lumps settle down and enter the disintegrating chamber. There the lumps are subjected to an intensive disintegrating treatment, not only by virtue of impact from the projections or blades of the rotor, but also by the intensive hydraulic shearing action set up by the rapidly flowing currents of water thereby developed.

During the sequence of operations many of the lumps are immediately resolved into their discrete particle size, but those which are not so disintegrated are projected by the centrifugal component of force to the outer zones of the sedimentation chamber and subside along the walls thereof, and are again caused to pass through the disintegrating zone. Those lumps of material which thus reenter the sedimentation chamber are recycled until reduced in size to the degree where their subsidence rate in the water is so small that they will be swept upward and out through the overflow pipe along with the originally fine particles. In this cycling motion, the annular baffle prevents forcible upward flow of the mixture from the conduit 22, while the space between the inner circumference of the baffle and the hopper allows a gentle overflow of the slurry at a rate proportional to the rate of admission of water. Hence the clay delivered from the blunger consists of particles so small that their subsidence rate is very slow; and many of the particles are of the ultimate discrete particle size.

Blungers having the principles herein described are more efficient and more compact than any other known types of blunging unit. We have found it possible to construct blungers of our type capable of processing approximately fifty tons of clay per hour and having a total weight, inclusive of contents, of less than ten tons. This large capacity and moderate weight make it possible to mount the blunger on a mobile tractor-type chassis and use it in combination with a primary digging machine, such as that herein illustrated, a steam shovel, or other digger.

We have applied the distinctive name of "vortex blunger" to our novel blunging unit because of the whirling movement imparted to the liquid within the sedimentation chamber.

Figure 6:
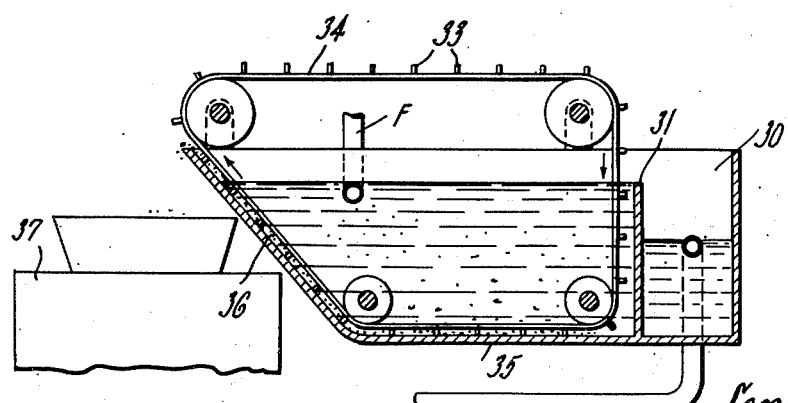
Fig. 6 is a sectional view of a so called classifier suitable for use in the combination illustrated in Fig. 5.

The slurry delivered from the blunger may be conveyed through pipe lines all the way to a mill for further and final processing, or may be flowed to a nearby installation for preliminary classification and/or removal or grit, mica and other oversize material. We have shown in Fig. 5 the combination with the apparatus precedently described of equipment located at the margin of the pit for reducing, to finer size, particles of the slurry delivered from the blunger C which are not fine enough. In this combination the pipe line F leads to a classifier 30, in which oversize particles are caused to settle out. A device of known character which will serve this purpose satisfactorily is shown in detail in Fig. 6. It comprises a tank divided by a dam or weir 31 into two compartments of unequal sizes. The pipe line F delivers slurry into the larger compartment, and a pipe 32 leads from the smaller compartment. The larger compartment is so large in proportion to the capacity of the pipe which conducts slurry into it that time is afforded for all lumps to settle out, wherefore the slurry which overflows the weir contains only particles of the desired degree of fineness. A sweeper consisting of bars 33 connected at their ends to conveyer belts or chains 34 passes along the bottom 35 and upward along the inclined side wall 36 of the classifier, being carried around suitably disposed guide rolls and propelled by one of them, so that it displaces the sediment and discharges it over the lip of the wall 36. A secondary blunger 37 is suitably located to receive the sediment discharged from the classifier and in it the lumps are given a sufficiently prolonged agitation to break them down to the required sizes. This blunger may be of the same type and design as the vortex blunger previously described, or may be of any other approved type, provided only it is adapted and operated to perform a sufficiently long-extended treatment.

The pipe 32 by which slurry is conducted from the classifier to the mill has a branch 38 leading to the blunger 37, and valves 39 and 40 are provided so that any necessary proportion of the slurry can be diverted to the blunger. The delivery pipe 41 from the secondary blunger joins the pipe 32 so that the material delivered thereby at the mill has the same density as that delivered from the first blunger.

It is to be remembered that our method and apparatus combination are not limited to the use of the shale planer here shown and described as the means for taking clay from the deposit and breaking it into pieces of practicable sizes to be treated in the blunger. We may use, instead, equipment such as a steam shovel, or comparable digging unit, together with a conditioning device, such as a roll crusher, to reduce large lumps taken by the shovel to practicable sizes, if necessary or desirable. The elements of such equipment are well known and available on the market in such forms as to permit of conjoint use in an assemblage equivalent to the shale planer and in combination with the plunger so as to deliver the clay into the latter. Hence the terms "digger," "digging machine," "digging unit," and the like used in this specification and the claims are intended to embrace all machines and means by which clay can be removed from the deposit, broken into pieces of suitable sizes, either in the course of digging or by crushing means, and delivered to the blunger.

What we claim is:

1. A blunging unit comprising a sedimentation chamber adapted to contain water and pieces of clay, a disintegrating chamber connected with the bottom portion of the sedimentation chamber and being of enlarging cross section away from its junction with the sedimentation chamber, a conduit leading from the larger end of the disintegrating chamber into the sedimentation chamber at a relatively high level, an annular baffle connected with the walls of the sedimentation chamber at a level above that of the conduit, a rotary disintegrator in the disintegrating chamber adapted to induce a flow of liquid therethrough when rotated, an inlet pipe for water from an outside source opening into the side of the sedimentation chamber below the baffle, and an eduction connection above the baffle leading from the sedimentation chamber.

2. A blunging unit comprising an upright substantially cylindrical sedimentation chamber having a tapered bottom end, an inlet pipe opening tangentially through the side of said chamber at an intermediate level, a tapered disintegrating chamber connected at its smaller end with the lower part of the sedimentation chamber, a rotor in said disintegrating chamber having blades of varying radial extent similar to the taper characteristics of the chamber, a conduit leading upward from the disintegrating chamber and having a tangential delivering connection with the side of the sedimentation chamber, an annular baffle connected with the side walls of the sedimentation chamber above the inlet of said conduit, a hopper leading into the top of the sedimentation chamber through the space surrounded by said baffle, and an eduction pipe leading from the interior of the sedimentation chamber at a level above said baffle.

3. A blunging unit comprising a sedimentation chamber, a disintegrating chamber communicating with the bottom of the sedimentation chamber and being of enlarging conical formation outwardly from the point of communication between the two chambers, a rotor in said disintegrating chamber having blades of tapering formation similar to the conical form of the chamber, the sedimentation chamber having provisions at the top for admission of dry clay, a separate inlet for water in the side of the sedimentation chamber, a circulating connection leading upwardly from the large end of the disintegrating chamber to the upper part of the sedimentation chamber, an outlet from the sedimentation chamber at a level above the point of entrance to the sedimentation chamber of the last named connection, and an annular baffle adjacent to the walls of the sedimentation chamber between the said outlet and point of entrance; the arrangement being such that lumps of clay delivered to the sedimentation chamber by said connection settle downward while water bearing particles in suspension rises through the space within the annular baffle to the outlet.

4. The blunging unit set forth in claim 3 and including a density controller located to be influenced by the specific gravity of the slurry passing to the outlet, and a throttle valve in the water inlet associated with said density controller to be variously located between the open and closed positions thereby.

5. A blunging unit comprising a sedimentation chamber having a downwardly tapered bottom extending without obstruction from the side walls of the chamber to its lowest point, a disintegrating chamber in flow communication with the sedimentation chamber through the lowest part of the bottom thereof, a conduit leading from the disintegrating chamber to connection with the sedimentation chamber, a rotary disintegrator in the disintegrating chamber organized to induce flow of liquid therethrough toward the conduit, a separate inlet pipe opening into the sedimentation chamber, and an eduction connection leading from the upper part of the sedimentation chamber; the before named conduit and inlet pipe being connected with the sedimentation chamber above the bottom thereof and below the level of the eduction connection.

6. A blunging unit comprising a sedimentation chamber adapted to contain water and pieces of clay and having provisions for admission of water from an outside source, a disintegrating chamber in flow connection with the bottom portion of the sedimentation chamber, a conduit leading away from the disintegrating chamber to connection with the sedimentation chamber at a level above the bottom of the latter, a disintegrator in the disintegrating chamber organized to induce flow of fluid therethrough toward said conduit, an annular baffle connected with the side walls of the sedimentation chamber above the level at which said conduit is connected with the chamber, and an eduction pipe leading from the sedimentation chamber at a level above said baffle.

7. A blunging unit comprising a sedimentation chamber, a pipe disposed to conduct water into said chamber, a flow controlling valve in said pipe, a discharge pipe leading from the top part of said chamber, a distintegrating chamber in flow connection with the bottom of the sedimentation chamber, a disintegrating rotor in the disintegrating chamber, a conduit leading from the disintegrating chamber to the upper part of the disintegrating chamber at a level therein below the discharge pipe, a density controller located in position to be influenced by the specific gravity of the slurry passing to the discharge pipe, and means whereby the density controller actuates the control valve in the inlet pipe.

8. The method of converting solid clay to a slurry, which comprises progressively placing fragments of clay in a chamber, causing water from an outside source to flow progressively into said chamber, delivering water and clay from the chamber to a disintegrator and therein disintegrating lumps of clay and intimately mixing clay and water together, returning the mixture of clay and water to the chamber in a circulating path such that lumps massive enough to settle through the water are returned to the disintegrator, discharging from the upper part of the chamber the slurry composed of water and fine particles of clay, and adjusting the inflow of water to the chamber in accordance with the specific gravity of the slurry being discharged.

SANFORD C. LYONS.
ERWIN G. DALLMUS.

REFERENCES CITED

The following references are of record in the file of this patent:

UNITED STATES PATENTS

| Number | Name | Date |
| --- | --- | --- |
| 449,102 | Andrews | Mar. 31, 1891 |
| 550,051 | McKinlay | Nov. 19, 1895 |
| 594,240 | Forsyth | Nov. 23, 1897 |
| 1,083,558 | Powell | Jan. 6, 1914 |
| 1,431,422 | Randecker | Oct. 10, 1922 |
| 1,753,804 | Powell | Apr. 8, 1930 |
| 2,173,975 | Lyons | Sept. 26, 1939 |
| 2,375,689 | Reeder | May 8, 1945 |

FOREIGN PATENTS

| Number | Country | Date |
| --- | --- | --- |
| 128,333 | Great Britain | June 26, 1919 |